(No Model.) 6 Sheets—Sheet 1.
G. F. STEEDMAN.
AIR BRAKE SYSTEM.
No. 542,948. Patented July 16, 1895.
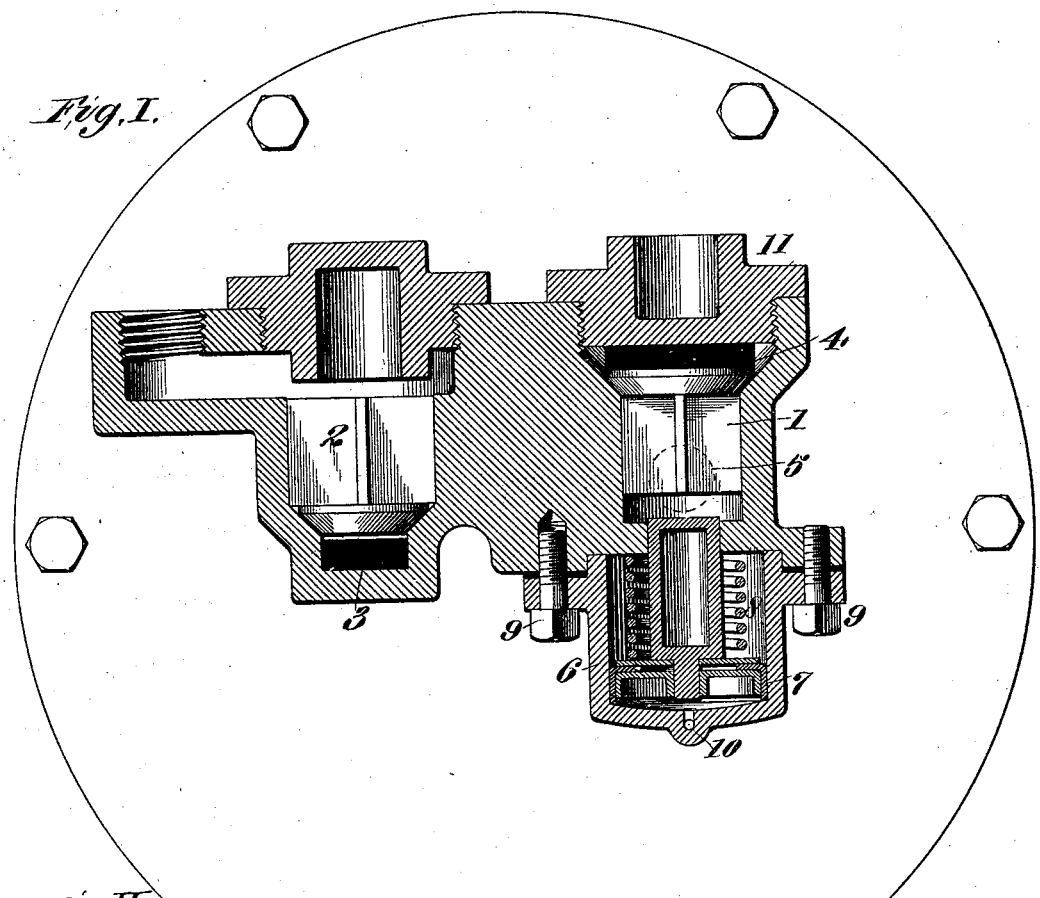
Fig. I.
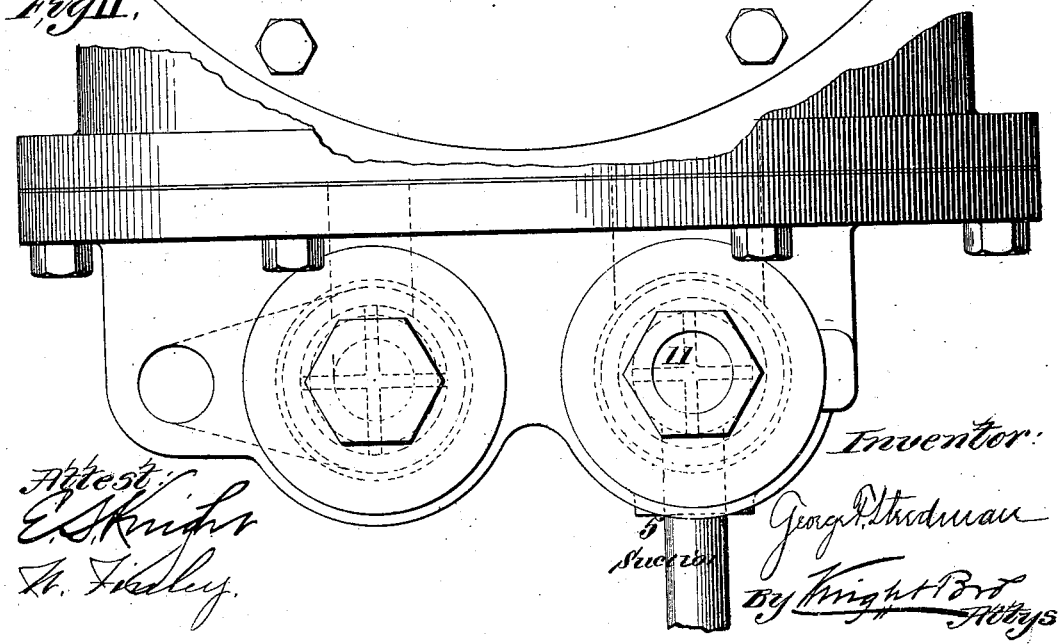
Fig. II.
Attest:
E. Knight
H. Findley
Inventor:
George F. Steedman
By Knight Bro.
Attys (No Model.) 6 Sheets—Sheet 2.
G. F. STEEDMAN.
AIR BRAKE SYSTEM.
No. 542,948. Patented July 16, 1895.
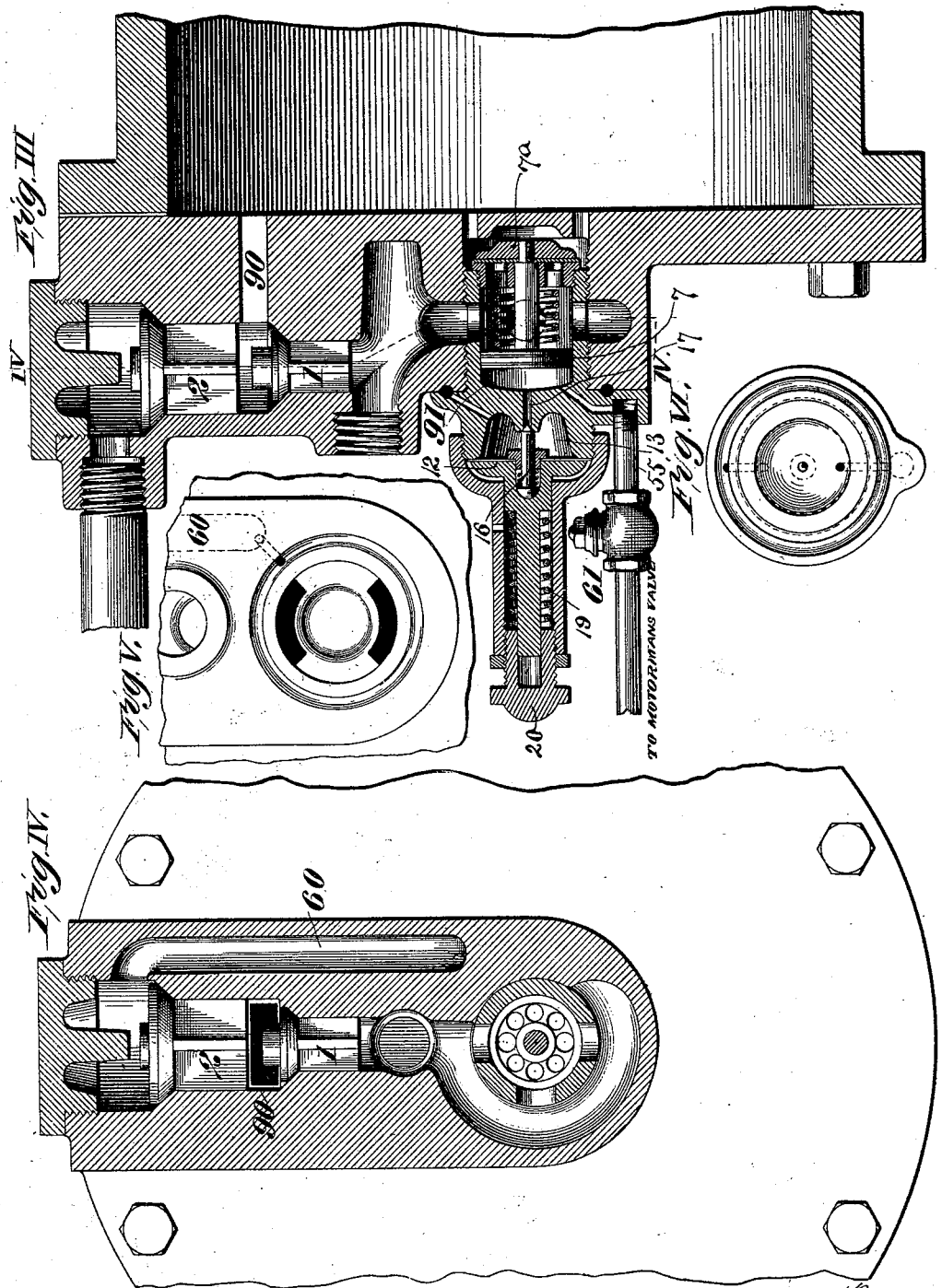

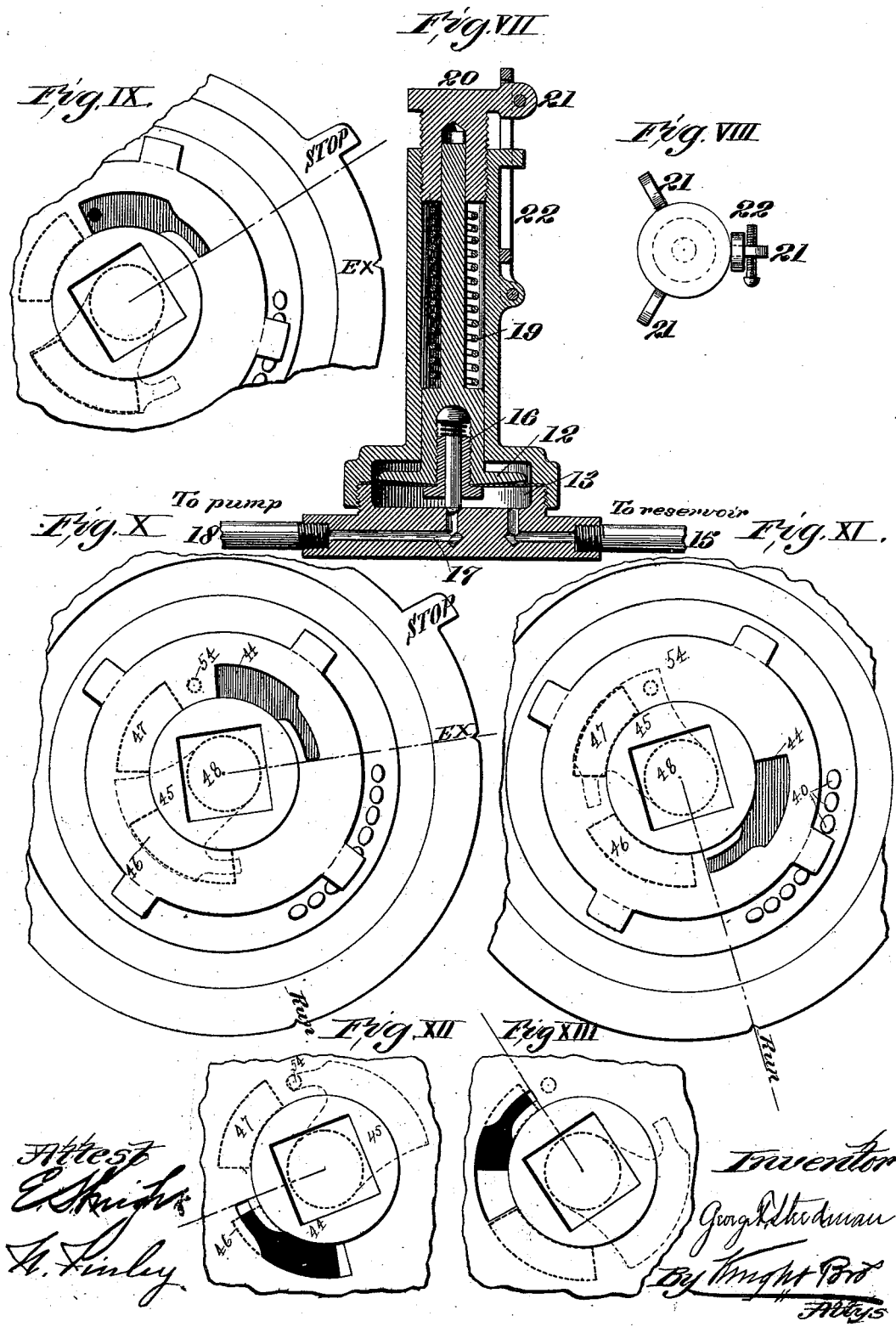

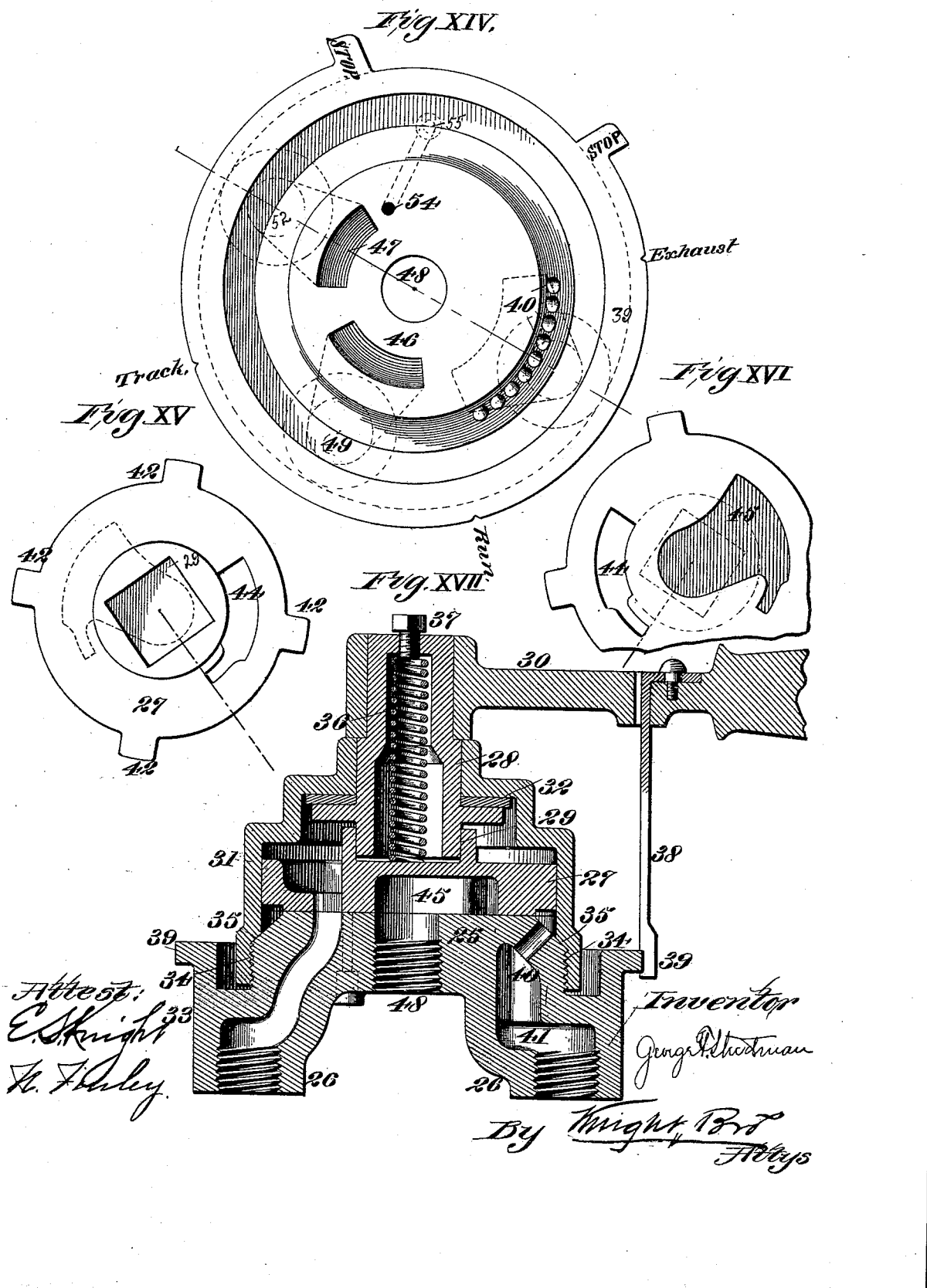

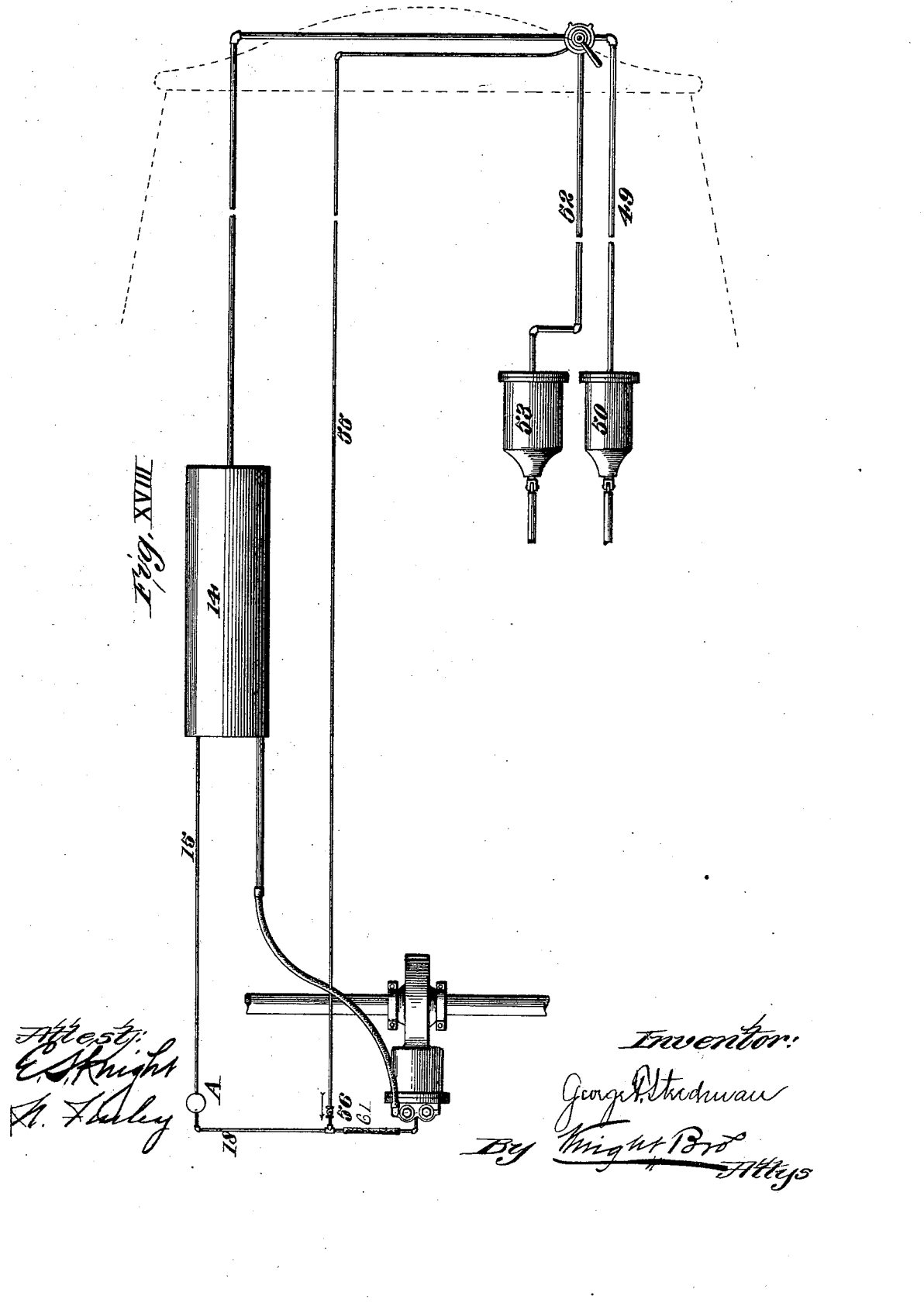

(No Model.) 6 Sheets—Sheet 6.
G. F. STEEDMAN.
AIR BRAKE SYSTEM.
No. 542,948. Patented July 16, 1895.
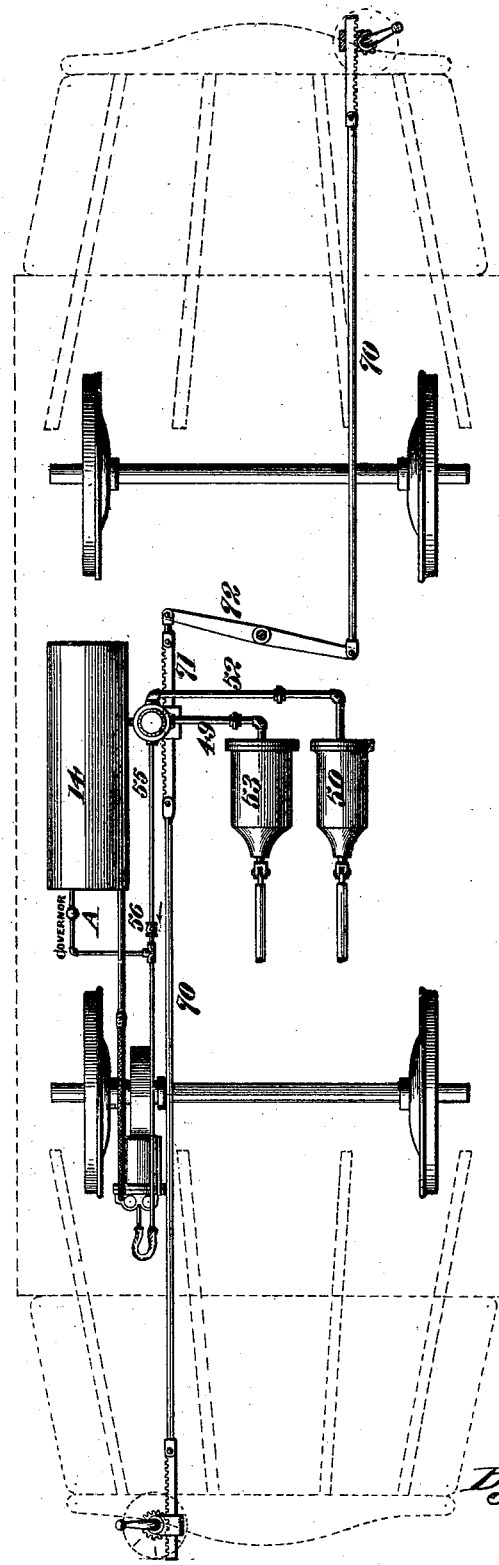
Fig. XIX.
Attest:
E. S. Knight
H. Finley.
Inventor:
George F. Steedman
By Knight Bro's
Att'ys

UNITED STATES PATENT OFFICE.

GEORGE F. STEEDMAN, OF ST. LOUIS, MISSOURI.

AIR-BRAKE SYSTEM.

SPECIFICATION forming part of Letters Patent No. 542,948, dated July 16, 1895.

Application filed October 10, 1894. Serial No. 525,462. (No model.)

*To all whom it may concern:*

Be it known that I, GEORGE F. STEEDMAN, of the city of St. Louis, in the State of Missouri, have invented a certain new and useful Improvement in Air-Brake Systems, of which the following is a full, clear, and exact description, reference being had to the accompanying drawings, forming part of this specification.

The object of my invention is to provide a means whereby the compressing of air in the air-pump can be thoroughly regulated, both automatically and by voluntary action of the operator in charge, and to provide an engineer's or motorman's valve by means of which the admission of air to brake-cylinders shall be adequately controlled and in connection with the governor control the action of the pump when desired.

My invention is particularly applicable to street-car use, where the pump is usually run by rotation of the axle and is sleeved or journaled on the axle and operated by an eccentric, but is not limited in any way to this use.

The principle upon which the governor works is to raise a valve from its seat, which when unseated opens communication through a port between the interior of the pump and the atmosphere. I hereinafter speak of this as the "major governor-valve." This valve is raised from its seat automatically when the pressure in the reservoir into which the pump discharges reaches a certain maximum limit, or is raised from its seat voluntarily when it is wished to stop the action of the pump for reasons hereinafter detailed. By raising the ordinary induction-valve from its seat a passage is opened between the interior of the pump and the atmosphere, and if held from its seat its regular action is suspended, and instead of admitting air to the cylinder and then closing, as customary, the air has free passage in either direction, as if the induction-valve were not existing and an opening made in the cylinder-head. The induction-valve can therefore be used as the major governor-valve; but I do not limit myself to the induction-valve only as a major valve, and the drawings show an induction-valve used as the major governor-valve, and also a separate valve used therefor and in no wise interfering with the action of the induction-valve.

The principle of the engineer's or motorman's valve, and hereinafter called "motorman's valve," is that in proper order and in adequate manner one valve and one handle perform the duties of admitting and releasing compressed air to the brake-cylinders and when desired to admit compressed air to the governor device independent of its automatic action and stop the compressing of air by the pump, allowing the piston to do no other work than overcome friction.

My invention consists in features of novelty hereinafter fully described, and pointed out in the claims.

The accompanying drawings show mechanisms which fulfill the objects as aforesaid; but I do not confine myself to their specific constructions.

Figure I shows a cylinder-head of a single-acting pump with induction and eduction valves, and under the induction-valve is a piston to raise the induction-valve from its seat when compressed air is admitted under the piston. Here the induction-valve is the major governor-valve. A double-acting pump could be used, both induction-valves being raised by a single piston, or in some other equally obvious manner by major governor-valves. Fig. II is a top view of the parts shown in Fig. I. Fig. III shows in section another manner of carrying out the principles of this invention where the major governor-valve is not the induction-valve, and the automatic governor device is mounted on the cylinder-head, and the induction and eduction valves are placed in one chamber instead of two, as shown in Fig. I. Fig. IV is a section taken on line IV IV, Fig. III. Fig. V is a detail view, looking at the end of Fig. III, with the automatic governor device removed. Fig. VI is an inside end view of the governor piston-cylinder shown in Fig. III. Fig. VII shows the automatic governor device as separate and distinct and more or less remote from the pump. Fig. VIII is a view of the upper end of the part shown in Fig. VII. Figs. IX to XVI, inclusive, are diagram views illustrating different positions and views of the motorman's valve. Fig. XVII is a vertical section of a motorman's valve. Fig. XVIII is a diagram showing the arrangement when the motorman's valve is located at the place of the motorman's stand. Fig. XIX is a similar view showing the arrangement when the motorman's valve is located beneath the car.

A great number of mechanical equivalents may be substituted for the motorman's valve, and I do not confine myself to the particular form, but to the novel points as claimed.

In Fig. I a common arrangement of induction-valve 1 and eduction-valve 2 is shown, each valve working in its own chamber and its travel limited by its own cap. From under the eduction-valve a port 3 communicates with the interior of the pump-cylinder. The valves work by gravity and are guided by wings, as usual. A port 4 opens into the interior of the pump-cylinder from over the induction-valve. The dotted line 5 near the bottom of the induction-valve shows the position of the suction-opening. Under the induction-valve is the governor-cylinder 6 and its piston 7, which is held away from the induction-valve by the governor piston-spring 8. The governor-cylinder is held to place by screws 9, as shown. Under the governor-piston is a chamber, into which is led a small pipe 10 from the motor-man's valve and automatic governor device, hereinafter to be described. The action of the induction and eduction valves needs no description. When compressed air is admitted under the governor-piston 7, it is raised and lifts the induction-valve, which is here the major governor-valve, also from its seat and forces it against its cap 11, so that it is held there and communication is kept open between the interior of cylinder and the open air and air cannot be compressed in the pump. When the compressed air is exhausted from under the piston 7 the piston-spring 8 returns the piston to its natural position and the induction-valve takes up its normal function.

In Fig. VII an automatic diaphragm-valve is shown, herein usually spoken of as an "automatic governor device." The diaphragm 12 forms a yielding cover to the chamber 13, which is connected to the air-reservoir 14 by a pipe 15. Connected to the diaphragm on the inner side is the minor governor-valve 16, which is termed the "minor governor-valve," seating in port 17, leading by pipe 18 to beneath the governor-piston 7 at 10. Above the diaphragm is a spring 19 and its regulating-nut 20, provided with wings 21 and hasp 22 to prevent its turning. This spring presses the minor governor-valve to its seat, unless the air-pressure under the diaphragm is stronger than the spring, when the minor governor-valve 16 will be unseated and the piston 7 and major governor-valve raised. Thus when the air-pressure in the reservoir reaches a desired maximum limit for which the governor-spring 19 is adjusted the minor governor-valve is unseated and piston 7 raised, holding open major governor-valve, which is in Fig. I induction-valve 1, and no more air is compressed until by a fall of pressure of air in the reservoir, caused by an application of brakes or leakage, the governor-spring overcomes the air under the diaphragm 12, the minor governor-valve 16 seats, air leaks around piston 7, which is forced back by the spring 8 and valve 1, and major governor-valve seats, when the pump resumes its normal action. There is no difficulty in providing proper leakage around the governor-piston 7.

Before describing Fig. III, which shows a simple mechanical change from Figs. I and VII, I will describe Fig. XVII, a form of motorman's valve embodying the principles of this invention. The valve is of the disk type. 25 is the valve-seat and main body with ports and pipe connections 26. 27 is the disk-valve with its ports. 28 is the valve-stem fitting slightly loose in a square socket 29 in the valve and carrying the handle 30. The stem passes through the housing 31 and is packed by a leather washer 32. The housing 31 screws over the body 33 of the valve, as shown at 34, and packs itself on the beveled seat 35. The stem 28 is hollow and contains a spring 36, which keeps the valve 27 to its seat, and the spring keeps the stem up when the air-pressure is exhausted, so that the valve is always in working position. The valve and valve-seat are oiled through oil-cap 37 without having to separate the parts. The handle 30 is provided with an index-spring 38, which bears against index-flange 39 and denotes the position of the valve on its seat. Compressed air is admitted to the valve through a series of holes 40 (see Fig. XIV) bored into cored passage 41, (see Fig. XVII,) connecting with the pipe from the air-reservoir. These holes 40 are bored in the annular space shown, and as valve 27 is provided with wing-like guides 42 the ports 40 have free communication with the inside of the valve-housing. Admission-port 44 passes clear through the valve, Figs. XV and XVI. On the under side of valve is the recess 45, which does not extend through the valve and which communicates with the exhaust-port. In the valve-seat are three main ports 46, 47, and 48. 48 is centrally placed and communicates constantly with the recess 45 in valve 27 and with the atmosphere and constitutes the exhaust-port. The wheel-brake port 46 communicates with the pipe 49 leading to wheel-brake cylinder 50. Port 46 is slightly shorter than space between pointed ends of ports 45 and 44 in valve 27, the difference in length being dead space, and is to give some range to the index, so as it will not have to be so extremely accurate, and to prevent leakage. On the same circumference and about one-fouth of an inch away from wheel-brake port 46 is the port 47, which communicates through pipe 52 with the track-brake cylinder 53. About one-fourth around from track-brake port 47 is a port 54, which communicates with a pipe 55, leading to the governor-cylinder. The operation of the valve can be well seen by making a tracing of valve 27, Figs. XV and XVI, and placing it over the top view of valve-seat, Fig. XIV, when the ports can be seen through the transparent tracing material and the action of valve clearly shown.

In non-active or running position the wheel-brake port 46 is under the blank space between the pointed ends of the valve-ports 45 and 44. (See Fig. XI.) The exhaust-port 48 now connects track-brake port 47, and also governor-port 54, with the exhaust-port 48, so that the track-brake cylinder and part of pipe leading to governor-cylinder behind check-valve 56 are exhausted. When we move valve 27 to the right, or clockwise, (when looking down on valve-seat,) the small end of air-admission port 44 first communicates with wheel-brake port 46, (see Figs. XI and XII,) and further movement in same direction increasing the area of port 44 over port 46. If the valve is turned to the left or anticlockwise, (when looking down on valve-seat,) until brought back to the running position, (marked "Run,") the compressed air which has been admitted to the wheel-brake is held there. The amount of compressed air that has been admitted to the wheel-brake cylinders depends upon the time and area which port 44 has registered with 46. If the tip of 44 is registered with 46 for but a second or two, the pressure in the wheel-brake cylinder will be very slight and the brakes will be applied but lightly to the wheels to retard the motion of the car or to make an easy stop. If the port 44 is thrown so as to register with the whole of 46 then a large communication is established between a wheel-brake cylinder and the air-reservoir and the pressure rises very rapidly and the brakes are applied to their full force quickly. If the point of 44 is left over 46 the pressure will gradually rise to the maximum in the wheel-brake cylinder and the brakes be applied to their full power gradually. If the wheel-brakes are on lightly another quick swing to the right and then back to "Run" will add a little more pressure, so that the wheel-brakes can be applied quickly or slowly, strongly or lightly, and if not strong enough at one motion of handle more pressure can be added by a second or third movement, or swing to right and then back to "Run."

If the handle is turned to the left from running position, exhaust-port 45 registers with 46 (see Fig. X) and pressure is exhausted in proportion to the area of 45 registering with 46 and time of registering, so that the brakes can be released in same way as they are applied. If the brakes have been applied and are on too strong, part of the pressure can be released by a backward swing of the handle. When index-spring 38 registers with notch marked "Run" (see Fig. XIV) on index, the valve is in running or non-active position. When index is at "Exhaust," then exhaust-port 45 is registering full with 46, and when at "Track," admission-port 44 is registering full with 46.

I have so far confined myself to the action of valve admitting compressed air to wheel-brake cylinders only. There may be one or more cylinders on one or more cars.

I will now describe the application by the same valve of a second set of brakes working on the rail to secure further braking power before I describe the action of the valve in connection with the governor.

When the index-spring registers with the depression in the index marked "Track," the ports 44 and 45 bear the same relation to port 47 as the ports 44 and 45 did to port 46 when the handle was in running position. A movement to the right from "Track" will admit compressed air to port 47 in proportion to the amount of movement and time handle is held away from "Track." A quick short motion away from "Track" and back again will apply track-brakes but slightly, while a full sweep to the limit of index away from "Track" will apply the track-brakes to full power and as quick as may be. Motion back from "Track" toward "Run" will exhaust the track-brake in same way as the wheel-brake is exhausted when the handle is moved from "Run" toward "Exhaust."

If handle be thrown quickly from "Run" across "Track" and to the limit of index, then there will be emergency application of all the available braking power, and moving the handle back to "Exhaust" will release all the brakes.

Having described the manner of applying and releasing the brakes, I will now take up the action of the motorman's valve in connection with the governor to stop the pump when it is wished to do so.

Port 54 communicates with pipe 55, leading to the governor-cylinder under governor-piston 7 and the major governor-valve. When handle 30 is in running position, Fig. XI, port 54 is under port 45 and the pipe 55, leading to the governor-cylinder, called "voluntary pipe," is exhausted as far as the check-valve 56.

When the handle is moved to "Exhaust" position, Fig. X, the port 54 is under blank space between the valve-ports 45 and 44 and 54 is inoperative. When we move handle back from "Exhaust" to stop, Fig. IX, the back edge of admission-port 44 passes across 54 and 54 registers with 44, and compressed air being admitted behind the governor-piston 7 the major governor-valve is raised from its seat and opening is made in the pump-cylinder head. When the handle is moved back to "Run" the voluntary pipe is exhausted by port 45, the major governor, and valve-seats and normal action of the pump, Fig. XIII, is resumed.

The sequence of motions of the handle is exactly right for use. Suppose the car or train has been stopped on a steep upgrade and the pressure has been reduced in the reservoir by the application of the brakes. Ordinarily, by the action of the automatic governor, the pump would start up when the brakes are released and the axle turns. If the power is limited it is not advisable to have to work the pump when the train is to be started uphill or with a heavy load. This is especially true in case of electric railroads, where the power is sometimes weakest when the traffic is heaviest and all the power is required to move the car or train. The handle is at "Run" after the train has come to a stop, and when it is wished to start up the handle is brought to "Exhaust," releasing brakes. If it is desirable not to run the pump, for reasons just given, the handle is thrown by "Exhaust" to the end of the index and no air is then compressed, as the major governor-valve is unseated. The pump is then controlled by motion of the handle between "Run" and the back stop and the brakes controlled between "Run" and the forward stop, so that the two functions of the valve never conflict. With the voluntary governor much time is saved. By this method, if the reservoirs are large enough in volume, we can pump air on downgrades only when the automatic governor will control maximum pressure, using no motive power to brake with, but employing the power of gravity on downgrades only—a great commercial point.

Figs. III and IV represent the parts shown in Figs. I and VII differently arranged. The induction and eduction valves 1 and 2 are one over the other and there is but one port 90 leading from between them to the pump-cylinder. The major governor-valve 7ª here is a separate valve from the induction-valve, opening into the exhaust-chamber when unseated. The automatic diaphragm governor-valve device 12 13 16, &c., instead of being remote from the cylinder-head, as shown in Fig. VII, is screwed directly upon the governor-cylinder 91. Pressure is maintained under the diaphragm 12 by a connection through ports and cored passage 60 to the chamber above the eduction-valve 2. The voluntary pipe 55 is brought in as before. The action is the same as of parts shown in Figs. I and VII, the major governor-valve 7ª being unseated when air is admitted behind the governor-piston 7, either by automatic valve or voluntary pipe 55. In this arrangement a check-valve 61 is placed in the voluntary pipe 55 just before it enters governor-cylinder 91, so that when voluntary pipe is exhausted governor-cylinder is not exhausted, and, if automatic valve works, the pressure cannot escape through the voluntary pipe and motorman's valve.

In the arrangement shown in Fig. XVIII the automatic governor is placed on the motor-car at A, near the axle on which the pump is mounted, and a pipe 15 is led to it from the reservoir 14, which connects with the chamber 13 under the diaphragm 12. From the minor-governor-valve port 17 a pipe 18 or hose leads to the governor-cylinder 6 on the pump. Into this pipe (the governor-pipe 18) is lead the voluntary pipe 55 from the motorman's valve. Just before the voluntary pipe taps this pipe 18 to the governor-cylinder there is the check-valve 56, which opens toward the governor-pipe but does not allow pressure from the governor-pipe 18 to pass out of the voluntary pipe, for reasons explained immediately above.

This same principle of motorman's valve and governor can be employed in steam air-pumps, such as are used on steam-railroads to-day, and in which the governor differs from the one shown only in the major governor-valve. In steam-air-pump governors the governor-valve opens or closes in a steam-pipe which goes to the steam-cylinder of the air-pump, and by seating it the pump is stopped. My purpose is to have the claims of this patent cover the motorman's valve in connection with such a pump and governor, as well as in the axle-pump described and used for explanation.

In cases where this invention is applied to street-car service, where the car is running first in one direction and then in the other, a motorman's valve such as shown can be placed on each platform (but one motorman's valve being shown in Fig. XVIII) and proper pipe connections made thereto, or a single valve can be placed near the center of the car and operated from both platforms by means of rods 70, a rack 71, and a lever 72. (See Fig. XIX.) Where the car runs in both directions it requires a large amount of complicated piping to have an engineer's valve on each platform. The large amount of piping is expensive, complicates the other machinery under the car, and is a great source of annoyance, due to leaks which will occur where there is so much piping on such a jarring machine as a street-car. I do away with this largely by placing the valve under the car, as shown in Fig. XIX, near to the pump, reservoir, and cylinders, and use about seventy-five per cent. less pipe than is required if two valves are used on the car-platforms. I prefer to use gears and racks to transmit motion when a single valve under the car is used; but anything else appropriate may be used. The motorman's valve shown in Figs. XIV, XV, XVI, and XVII is designed for one valve only to a car running always with the same end forward. Very slight mechanical change is required, however, in design for two valves to a car or for one valve run from either end.

It is important in a good street-car air-brake to be able to apply the brakes to any desired intensity and quickly or slowly and to exhaust them in the same manner. The form of valve shown does this most admirably. In street-car practice the brakes are applied very frequently and the valve needs oiling at intervals of a few days. It would be inconvenient to remove the housing to do this, so I employ the hollow stem 28 to the valve and a cap in it, so that oiling the valves is a very easy matter. An improperly-oiled motorman's valve is turned with much difficulty and wears very quickly.

In a motorman's valve for street-cars where an air track-brake is employed with an air wheel-brake the track-brake must be powerful to be of any great benefit and must exert a total pressure on the track of nearly three-fourths the weight of the car to make a good stop. It is very obvious that if the track-brake were applied very quickly to its full force the result might be disastrous or most uncomfortable. The track-brake port in the valve must be of such size that where thrown on suddenly to its fullest extent the pressure must rise in the track-brake cylinders somewhat gradually. This point must be determined by experiment, so that the track-brakes can be applied as quickly as safety will allow, but no quicker, and maximum area of track-brake port must be designed accordingly. Wheel-brake port area is important, but not so important as track-brake port proportion.

I have shown a piston moving in a cylinder for raising the major governor-valve from its seat, but a diaphragm with a leakage-port would operate it.

There is a possibility of the governor-valve in the automatic spring-pressed governor leaking or of a leak into the governor-port 54 of motorman's valve, which would, if neglected, raise the major governor-valve from its seat and stop the pumping. To guard against this I make the spring 8, pressing the governor-piston 7 back, of considerable strength, so that it requires considerable air-pressure behind the piston to compress spring 8 and unseat the major governor-valve. By so doing I establish a minimum limit for my governor as well as maximum, and the governor may be said to be inoperative under the minimum limit. This always insures the pump furnishing enough pressure for a stop, even if the governor is out of order.

I desire to call especial attention to the arrangement shown in Fig. XIX as embodying the purposes of my invention of providing a motorman's valve to adequately control the admission and release of air to braking-cylinders. It is possible to place one motorman's valve on each platform and connect as already referred to; but there is so much waste volume in the pipes that has to be filled and exhausted at every application of brakes that the valve is not as sensitive as it may be, and much compressed air and energy are wasted. By the arrangement of Fig. XIX we have the smallest possible waste volume or clearance in pipes. The expense of putting in all the piping under the arrangement of Fig. XVIII is comparatively great and very unsatisfactory when in, as we have numerous elbows, unions, and connections to leak. It is very often necessary to provide flexible joints in the pipes of Fig. XVIII to allow of the platforms of the car sagging under weights. By the arrangement of the system as shown in Fig. XIX we cheapen the cost of material and expense of applying it and have an arrangement economical in consumption of compressed air and less liable to need repairs. I lay special stress on the needs special to street-car air-brakes on the absence of anything in this art or other art like the arrangement and purposes described in Fig. XIX. It is necessary to have the valve near the cylinder for proper operation.

I also desire to call especial attention to the arrangement hereinbefore described relating to a minimum limit, under which conditions the pump cannot be kept from compressing air either voluntarily or automatically. If it were not for this arrangement a leak in any part of the governor, either automatic or voluntary, would raise the suction-valve from its seat and prevent the working of the pump, which would allow the pressure to drop. If such accident should happen with my improvement the pressure would not be allowed to drop below the minimum limit on account of the action of the strong spring upon the governor-piston, and the air-brakes would therefore work, though not at their full power.

Having fully described the purposes and aims of my invention and the manner of carrying them out, what I claim as new, and desire to secure by Letters Patent, is—

1. The combination of suitable constantly operating pumping mechanism adapted to be operated by the rotation of a car axle, and a compressed air reservoir, with an automatic governor adapted to stop the compressing action of the pump at a given pressure in the reservoir, and a device adapted to stop the compressing action of the pump at the will of the operator, substantially as set forth.

2. In a pump governor to control the compressing action of a pump, a valve seated in a port leading from the interior of the pump cylinder to the atmosphere, a compressed air mechanism capable of raising said valve when compressed air is admitted to it, a compressed air port leading to said mechanism opened or closed by an automatic spring regulated valve, and a compressed air port leading to said mechanism opened or closed by voluntary action of attendant.

3. In a pump governor, the combination of a pump adapted to be operated by the rotation of a car axle, a major valve seated in a port which connects the interior of the pump with the outside, a piston moving in a cylinder and unseating said valve when compressed air is admitted behind said piston, a chamber connected with the reservoir into which the pump discharges, closed on one side with a yielding cover, carrying a minor valve, a port and valve seat under said valve on the cover, leading into the chamber behind the piston, and a regulating spring over the yielding cover.

4. In a pump governor to control the pumping action of a pump, a valve closing when seated a passage connecting the interior of the pump with the atmosphere, a piston moving in a cylinder and raising the valve from its seat when pressure is admitted behind the piston, opening said passages, a valve for automatically admitting pressure behind said piston when pressure reaches a certain maximum limit in compressed air reservoir, and a valve to admit or release at will, pressure to or from a pipe leading from said voluntary valve into the cylinder behind the piston, and a check valve in said pipe to prevent pressure leaving said cylinder through said pipe, as shown.

5. An air compressing pump adapted to be actuated by the rotation of a car axle and provided with induction and eduction valves, a piston and cylinder raising and holding the induction valve from its seat when compressed air is admitted behind said piston, and an automatic compressed air valve that will admit air to said cylinder behind said piston when pressure in the reservoir reaches a certain desired limit for purposes enumerated.

6. The combination, in a pump governor of a pump operated by the rotation of a car axle, a valve, when seated, closing the passage leading from interior of the pump to the open air, a piston in a cylinder raising said valve from its seat, and opening said passage when compressed air is admitted behind said piston in the cylinder, a spring over said piston of such strength as to determine the minimum pressure at which governor will act, in combination with an automatic spring pressed valve to admit air behind the piston, which determines the maximum pressure at which the pump shall operate, substantially as set forth.

7. In an air brake system for railway cars, the combination of a constantly operating pump operated by the rotation of the car axle, a reservoir, a brake cylinder, an automatic compressed air governor adapted to control the pumping action of the pump, a motorman's valve to operate the air brakes, and a port in said valve to admit compressed air to said governor device, independently of its automatic action, as set forth.

8. In an air brake system for railway cars, the combination of a constantly operating pump operated by the rotation of a car axle, a reservoir, a brake cylinder, an automatic compressed air governor adapted to control the pumping action of pump, a motorman's valve to operate the air brakes, and a valve to admit compressed air to said governor device independently of its automatic action, as set forth.

9. In a motorman's valve a valve seat, a disk valve, a hollow stem separate from the valve, a housing screwed over the valve seat, and a spring in the hollow stem, bearing against the hollow stem at its upper end and against the disk valve at the lower end as and for the purpose stated.

GEORGE F. STEEDMAN.

In presence of—
 E. S. KNIGHT,
 STANLEY STONER.